United States Patent [19]

Burkhart et al.

[11] Patent Number: 5,082,868
[45] Date of Patent: Jan. 21, 1992

[54] METHOD FOR THE PREPARATION OF POLYURETHANE FOAMS

[75] Inventors: Georg Burkhart, Essen; Jürgen Fock, Duesseldorf; Volker Möhring, Muelheim/Ruhr, all of Fed. Rep. of Germany

[73] Assignee: Th. Goldschmidt AG, Essen, Fed. Rep. of Germany

[21] Appl. No.: 383,815

[22] Filed: Jul. 21, 1989

Related U.S. Application Data

[63] Continuation-in-part of Ser. No. 215,230, Jul. 5, 1988, abandoned.

[30] Foreign Application Priority Data

Jul. 25, 1987 [DE] Fed. Rep. of Germany ....... 3724717

[51] Int. Cl.$^5$ ...................... C08G 18/04; C08G 18/67; C08J 9/00
[52] U.S. Cl. .................... 521/114; 521/116; 521/137; 521/174; 521/176
[58] Field of Search ............... 521/114, 116, 137, 174, 521/176

[56] References Cited

U.S. PATENT DOCUMENTS

| | | | |
|---|---|---|---|
| 3,850,861 | 11/1974 | Fabris et al. | 521/137 |
| 3,914,188 | 10/1975 | Carroll et al. | 521/137 |
| 4,242,249 | 12/1980 | Van Cleve et al. | 521/137 |
| 4,264,755 | 4/1981 | Cross | 521/174 |
| 4,350,780 | 9/1982 | Van Cleve et al. | 521/137 |
| 4,476,252 | 10/1984 | Esselborn et al. | 521/172 |
| 4,529,745 | 7/1985 | Londrigan | 521/137 |
| 4,701,474 | 10/1987 | Bailey, Jr. et al. | 521/137 |
| 4,997,857 | 3/1991 | Timberlake et al. | 521/116 |

OTHER PUBLICATIONS

Encyclopedia of Polymer Science and Technology, vol. 10, pp. 1-73.
Organic Surfactants for Rigid Urethane and Isocyanurate Foam, pp. 76-83.

*Primary Examiner*—John Kight, III
*Assistant Examiner*—Rabon Sergent
*Attorney, Agent, or Firm*—Toren, McGeady & Associates

[57] ABSTRACT

A method for the preparation of rigid polyurethane and/or polyisocyanurate foams is disclosed. The foams are produced by the reaction of at least difunctional polyisocyanates, a polyol with 3 to 8 hydroxyl groups, said polyol having a hydroxyl number of about 150 to 800, catalysts, blowing agents and foam stabilizers, which are devoid of silicon atoms, as well as, optionally, conventional additives such as flame retardants and chain extenders. The foam stabilizers are copolymers of vinyl monomers and allyl- or methallyl polyoxalkylene ethers. The mole ratio of the monomers is 1:1 to 10:1.

The foams thus produced exhibit an improved burning behavior, good surface properties and outstanding thermal insulation effects. The stabilizers increase the solubility of the halocarbon blowing agents in the foaming formulation.

11 Claims, No Drawings

METHOD FOR THE PREPARATION OF POLYURETHANE FOAMS

This is a continuation-in-part of application Ser. No. 07/215,230 filed July 5, 1988, now abandoned.

FIELD OF THE INVENTION

The invention is directed to a method for the preparation of rigid polyurethane and/or polyisocyanurate foams from (1) at least difunctional polyisocyanates, (2) a polyol with 3 to 8 hydroxyl groups, said polyol having a hydroxyl number of about 150 to 800, (3) catalysts, (4) blowing agents, and (5) foam stabilizers devoid of silicon atoms, as well as, optionally, conventional additives such as flame retardants and chain extenders.

BACKGROUND INFORMATION AND PRIOR ART

Rigid polyurethane foams are produced in large amounts by known methods and from known raw materials. A comprehensive presentation of the raw materials used and the applicable methods may be found in Ullmann's "Enzyklopädie der technischen Chemie" (Encyclopedia of Chemical Engineering), 1980, volume 19, pages 301 to 341, and in the Kunststoff-Handbuch (Plastics Handbook), volume VII, "Polyurethanes" by R. Vieweg and A. Höchtlen, Carl Hanser Verlag, Munich, 1966, pages 504 to 544, as well as in "Polyurethane" Kunststoff-Handbuch ("Polyurethanes" Plastics Handbook) 7 by G. Oertel, Carl Hanser Verlag, Munich, 1983, pages 246 to 331.

Rigid polyurethane foams are preferably used for thermal insulation. For this application, they can be foamed into molded articles such as panels. It is also possible to fill hollow spaces of all types with foam, in which case the foam in the hollow space, as a structural element, frequently must also have load-bearing properties. It is furthermore possible to spray rigid polyurethane foams on tabular supports.

The quality and the properties of the rigid foam formed depend to a large extent on the structure and chemical composition of the foam stabilizer used.

As foam stabilizer, polysiloxane-polyoxyalkylene block copolymers are generally used. These stabilizers have a high effectiveness and can be adapted to the foaming system and the foaming method by selecting a suitable structure and composition. However, a disadvantage of these organosilicon stabilizers is their high prices. It has also been observed that the surfaces of the foamed material obtained by using organosilicon stabilizers are difficult to wet. As a result, subsequent protective treatments for the surfaces, such as painting or varnishing, become difficult. Attempts have therefore already been made to develop silicon-free stabilizers, which do not have these disadvantages.

German Patent 2,244,350 describes a method for the preparation of a polyurethane foam by the reaction of a polyisocyanate having at least 2 NCO groups, with a polyether polyol in the presence of a catalyst, a blowing agent and 0.5 to 3 parts by weight, based on 100 parts by weight of polyether polyol, of a polymer as cell stabilizer. The latter is polymerized by a free radical mechanism in an alcohol and contains incorporated N-vinylpyrrolidone. According to the patent, the entire liquid product obtained by polymerizing the following monomers is used as cell stabilizer:

a) 5 to 60% by weight of N-vinylpyrrolidone, b) 12.7 to 26.5% by weight of N-vinylpyrrolidone and 14.5 to 38.4% by weight of dibutyl maleate or c) 10 to 19% by weight of N-vinylpyrrolidone, 20 to 25% by weight of dibutyl maleate and 8 to 16% by weight of vinyl acetate.

The polymerization may optionally be carried out in the presence of a chain transfer agent. The polymerization is initiated with a free radical and is carried out in a liquid polyether polyol with 2 to 8 hydroxyl groups and a molecular weight of 150 to 650. The polymerization proceeds so that at least 30% of the monomers are polymerized. In the patent, it is presumed that the polymerized product is the cell-stabilizing component. However, if the polymer is separated from the polyol, it is less effective and does not regain its effectiveness if it is redissolved in the polyol.

Similar stabilizers are described in U.S. Pat. No. 3,914,188. The copolymer, which is effective as stabilizer, is synthesized by the copolymerization, in a polyether with capped end groups, of compounds of the formula

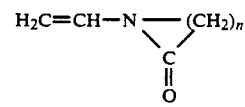

in which n=3, 4 or 5 and the ester of an unsaturated dicarboxylic acid with 4 or 5 carbon atoms. These stabilizing preparations have the advantage that they are largely inert towards isocyanates. Mixtures of these stabilizers with isocyanates can thus be produced, which have a long shelf life.

In the paper "Organic Surfactants for Rigid Urethane and Isocyanurate Foam" by M. J. Skowronski and M. E. Londigran in the Journal of Cellular Plastics 22, 1986, 235 ff., organic stabilizers are described for phenolic resin, isocyanurate and urethane foams. Particularly polymers of fumarate diesters, especially ditridecyl fumarate, are indicated to be useful. The polymerization of these esters was carried out in castor oil, which had been reacted with 36 moles of ethylene oxide in an addition reaction, the polymer having been left in the castor oil.

These known silicon-free stabilizers make it possible to produce rigid polyurethane foams, the surfaces of which can be wetted, painted and glued more satisfactorily. At the same time, the burning behavior of the rigid polyurethane foams is improved. They are, however, not able to fulfill all the required conditions. An important disadvantage of these silicon-free stabilizers as compared to organosilicon stabilizers lies in the reduced solubility of the halocarbon-based blowing agent in the foam system. This reduced solubility is observed especially when polyesterols are used. This is the cause of the inferior thermal insulation effects of the foamed materials, which has been observed in these cases.

OBJECT OF THE INVENTION

It is therefore a primary object of the present invention to provide silicon-free foam stabilizers, which enable the production of rigid polyurethane foams with improved burning behavior and advantageous surface properties, which, moreover, exhibit outstanding thermal insulation effects. Such foam stabilizers should therefore increase the solubility of halocarbon blowing agents in the foaming formulation. At the same time, the foam stabilizers should be inert towards isocyanate groups, whenever it is desired to prepare premixtures with the starting compounds of the foaming reaction having a long shelf life.

Another object of the invention is to provide a method for producing rigid polyurethane and polyisocyanurate foams, which have the above properties, with foam stabilizers devoid of silicon.

Generally, it is an object of the invention to improve on the art of foam production.

SUMMARY OF THE INVENTION

Surprisingly it has been ascertained that the above objects are superiorly attained by using foam stabilizers, which are copolymers obtained by the copolymerization of a) vinyl monomers of the general formula

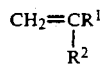

in which
$R^1$ is hydrogen or methyl,
$R^2$ is

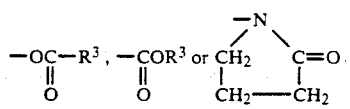

$R^3$ is alkyl with 1 to 4 carbon atoms,
and $R^1$, $R^2$ and $R^3$ may have different meanings if a mixture of monomers is present, and b) allyl- or methallylpolyoxyalkylene ethers of the general formula

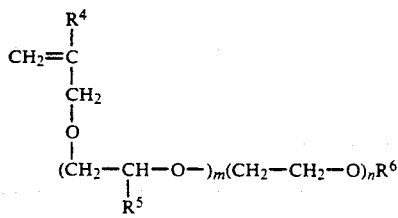

in which
$R^4$ is hydrogen and/or methyl,
$R^5$ is methyl and/or ethyl,
$R^6$ is hydrogen or a group unable to react with an isocyanate group,
m is a number from 1 to 120,
n is a number from 1 to 90, and
m:n has a value from 0.1 to 7,
and which have an average molecular weight of 400 to 5,000
the molar ratio, a:b being 1 to 10.

Vinyl acetate, vinyl propionate and vinyl butyrate are suitable vinyl monomers, in which $R^2$ represents the

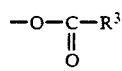

group. If $R^2$ represents a

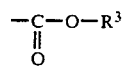

group, the corresponding ester of acrylic acid or methacrylic acid with aliphatic alcohols with 1 to 4 carbon atoms are present. Vinylpyrrolidone may furthermore be used as vinyl monomer.

Mixtures of vinyl monomers may also be used to synthesize the copolymers for the purposes of the invention.

The allyl- or methallylpoloxyalkylene ethers, used a monomer component b), are known compounds and can be synthesized by known procedures. In the general formula

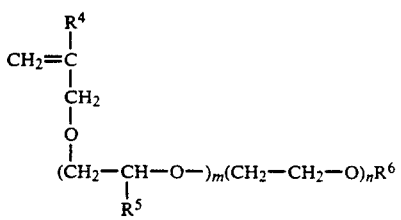

$R^4$ thus is hydrogen or a methyl group. The oxyalkylene chain has n oxyethylene units, n being a number from 1 to 90. The number of oxypropylene or oxybutylene units is indicated by the subscript m, its value depending on whether $R^5$ represents methyl or ethyl. The quotient m:n has a value of 0.1 to 7 and preferably of 0.6 to 2.

$R^6$ may be hydrogen; preferably, however, it is a group, which is unable to react with an isocyanate group. Especially preferred as end group $R^6$ is a hydrocarbon group with 1 to 8 carbon atoms, the

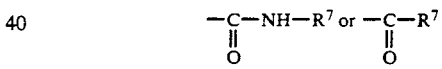

group, in which $R^7$ is a hydrocarbon group with 1 to 8 carbon atoms. Such inert end groups can be obtained by the reaction of the free OH groups of the polyoxyalkylene portion by known methods with suitable protecting agents before or after the copolymerization. Alkyl halides, such as methyl, ethyl, propyl, butyl, allyl or benzyl halide, olefinic compounds, such as isobutene or alkyl vinyl ethers, organic isocyanates, such as methyl, ethyl, butyl or phenyl isocyanate, or carboxylic acids or their derivatives, such as acetic acid, acetic anhydride, acetyl chloride, alkyl acetate, benzoic acid or benzoyl chloride may be used to provide a protective group.

By selecting a suitable $R^6$ group, it is possible to obtain copolymers, which are stable in the polyisocyanate and thus can be stored. However, if the stabilizers are to be mixed in with the foaming polyol, those polymers are preferred, in which at least half of the $R^6$ groups are hydrogen. As the content of hydroxyl groups increases, the solubility of the compounds in the polyols to be foamed also increases, so that they can be admixed in an improved manner and metered out more readily.

The average molecular weight of the allyl- or methallylpolyoxyalkylene ethers is 400 to 5,000. Preferably, the polyethers have an average molecular weight of 1,400 to 2,400.

The different oxyalkylene units may be linked in random or block fashion. However, the block-like arrangement is preferred. In the block-like arrangement, the polyoxyethylene block, preferably of the $R^6$ group, is adjacent to the chain end.

The molar ratio of the monomer components a):b) should be 1 to 10 and preferably 3 to 5.

The stabilizers, which are to be used in the method of the invention, are used in the usual amounts, that is, in amounts of 0.2 to 5% by weight based on the polyol.

It is, of course, possible to employ other stabilizers, optionally with other structures, or other additives in addition to the stabilizers, to be used in the method of the invention.

The usual compounds, known from the art for producing rigid polyurethane and/or polyisocyanurate foams, can be used as polyisocyanates and as polyols. Suitable polyisocyanates comprise the known aliphatic, cycloaliphatic, araliphatic, as well as aromatic diisocyanates or polyisocyanates. The preferred polyisocyanates are 2,4- and 2,6-toluene diisocyanate, diphenylmethane diisocyanate, polymethylenepolyphenyl isocyanate and mixtures thereof. The most preferred polyisocyanate for producing rigid polyurethane and/or polyisocyanurate foams is the so called crude MDI, i.e. a mixture of diphenylmethane diisocyanate and polymethylene polyphenyl isocyanate. The polyisocyanates usually have 2.3 to 3.4 isocyanate groups per molecule on an average.

The polyols have 3 to 8 hydroxyl groups. The hydroxyl number of the polyols is 150 to 800, preferable 300 to 600. Usually the polyols are polyether or polyester polyols, which have a branched structure and a relative low molecular weight. Examples of such compounds are familiar to the foaming expert and may be found, for example, in the German Offenlegungsschrift 2,832,253 and in the book "Polyurethane" Kunststoff-Handbuch 7 by Oertel, Carl Hanser Verlag, Munich, 1983, pages 42 to 92.

By means of the method of the invention, rigid polyurethane and/or polyisocyanurate foams are obtained, which have the following desired combination of properties: reduced flammability, improved paintability and gluing properties of the foam surface, high thermal insulation effects and an advantageous price to effectiveness ratio of the foam stabilizers.

In the following examples, the synthesis of the stabilizers, their use in the production of polyurethane foams and the application properties of the foams obtained are explained in greater detail, it being understood that these examples are given by way of illustration and not by way of limitation.

EXAMPLE 1

Synthesis of a Foam Stabilizer

An allylpolyoxyalkylene ether (1,800 g)

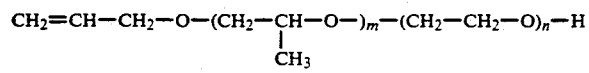

containing 50% by weight of polypropylene oxide and 50% by weight of polyethylene oxide and having an average molecular weight of 1,800 is heated in a 3-neck flask under a stream of nitrogen to 80° C. After the addition of 12 g of azodiisobutyronitrile, 258 g (3 moles) of vinyl acetate are metered in within a period of 2 hours. Over a period of 5 hours, calculated from the first addition, four lots of 12 g each of azodiisobutyronitrile are added, the temperature being maintained at 80° C. Finally, this temperature is maintained for a further 2 hours to complete the reaction.

The unreacted vinyl acetate is distilled off under vacuum. A bright yellow, viscous copolymer is obtained with a most frequent molecular weight of about 8,000, as determined by gel chromatography.

The foam stabilizers, which are listed in the following examples, are synthesized by the method described above and differ as follows:

Foam Stabilizer

A: Product as described above.
B: A total of 431 g (5 moles) of vinyl acetate is added.
C: A mixture of 172 g (2 moles) of vinyl acetate and 128 g (1 mole) of butyl acrylate are added.
D: N-vinylpyrrolidone (334 g, 3 moles) is added, but no vinyl acetate.
E: An allylpolyoxyalkylene ether with a most frequent molecular weight of 2,400 and containing 50% by weight of polypropylene oxide and 50% by weight of polyethylene oxide is used.
F: An allylpolyoxyalkylene ether with a most frequent molecular weight of 1,800 and containing 35% by weight of polybutylene oxide and 65% by weight of polyethylene oxide is used.
G: The product of Example 1 is subsequently reacted with an amount of butyl isocyanate equimolar with the OH groups.
H: The product of Example 1 is subsequently reacted with an amount of acetic anhydride equimolar with the OH groups.

Two silicon-free foam stabilizers are used for comparison.

Comparison Product 1

A polymer product, containing a copolymer of N-vinylpyrrolidone and dibutyl maleate, polymerized in a trifunctional polyol, which is described in U.S. Pat. No. 3,746,663.

Comparison Product 2

A polymer of tridecyl fumarate, polymerized in ethoxylated castor oil, described in U.S. Pat. No. 4,529,745.

EXAMPLES 2 TO 11

Preparation of Rigid Polyurethane Foams (of the Invention)

Rigid polyurethane foams are produced by a manual foaming process using the following formulation, which is suitable for the continuous production of rigid polyurethane panels on double belt installations (CLBS) (the data is given in parts by weight):

70 parts of a polyester polyol with a hydroxyl number of 350
30 parts of an amine polyether polyol with a hydroxyl number of 530
10 parts of tris-2-chloropropyl phosphate flame retardant
0.5 parts of water
1.0 parts of N,N-dimethylcyclohexylamine
2.0 parts of triemthyl-2-hydroxypropylammonium formate
0.75 parts of foam stabilizer
35.0 parts of trichlorofluoromethane 262.7 parts of crude diphenylmethane diisocyanate, MDI (index 250)

All components, other than the diisocyanate, are stirred for 30 seconds at 1,000 rpm at 23° C. The diisocyanate is then added and stirring is continued for a further 7 seconds at 2,500 rpm. Within 5 seconds, the mixture is added to a wooden mold with a cavity of 40×40×5 cm (degree of overfilling: approximately 5%). The mold is then closed immediately. Aluminum paper is used to line the mold. Before it is removed, the foam is left for about 20 minutes in the unheated mold. The core density of the foam obtained by this method is about 45 kg/m$^3$ (without the outer skin).

The samples, required for the particular physical measurements (without outer skin) are cut from the molded foam object with a foam saw. The physical measurements are carried out at 23° C. and 50% relative humidity. The values, listed in Table 1, are obtained by the following method:

a) Determination of the flammability by the "lowest oxygen index" method (LOI), ASTM D 2863/70. The higher the LOI, the lower is the flammability of the foam.

b) Determination of coefficient of thermal conductivity $\lambda$ by the method of DIN 52612 (Anacon instrument, model 88, sample size: 20×20×2.5 cm).

c) Determination of the closed cell nature with the air comparison pycnometer, model 930, from Beckmann by the Beckmann method (sample diameter: 3.4 cm; height: 4 cm).

The application properties of the foams obtained are given in Table 1 as a function of the stabilizer used.

TABLE 1

| Example | Foam Stabilizer | Cell Structure | LOI Value | $\lambda$ [W/m/K] | Closed Cells [%] |
|---|---|---|---|---|---|
| 2 | A | very fine | 23.0 | 0.0203 | 93.8 |
| 3 | B | very fine to fine | 23.3 | 0.0207 | 92.6 |
| 4 | C | very fine to fine | 23.2 | 0.0206 | 91.9 |
| 5 | D | very fine | 23.1 | 0.0202 | 93.8 |
| 6 | E | very fine to fine | 23.0 | 0.0204 | 92.8 |
| 7 | F | very fine to fine | 23.1 | 0.0202 | 94.1 |
| 8 | G | very fine to fine | 23.2 | 0.0212 | 90.7 |
| 9 | H | very fine to fine | 23.2 | 0.0202 | 93.6 |
| 10 | Comparison 1 | very fine to fine | 23.0 | 0.0212 | 90.8 |
| 11 | Comparison 2 | very fine to fine | 23.0 | 0.0211 | 91.3 |

The foams produced by the method of the invention show excellent cell structure with a very high proportion of closed cells; moreover, they exhibit an advantageous burning behavior and provide outstanding thermal insulation (low thermal conductivity).

EXAMPLE 12

Preparation of Flexible Polyurethane Foam (Not of the Invention—Comparation Example)

210 g polyether of hydroxylnumber 26.7, 7.2 g water, 0.45 g of bis-(2-N,N'-dimethylaminoethyl)ether, 4 g of stabilizer A and 0.8 g of tin(II)-octoate are mixed for 2 minutes in an impeller-type mixer. After about 1 minute, 82.0 g of a mixture of 80 weight percent of 2,4-toluylene diisocyanate and 20 weight percent of 2,6-toluylene diisocyanate with a TDI index of 105 is added and the whole is stirred at high speed for a few seconds. The expanding reaction mixture collapses after a few seconds. No flexible foam is produced.

EXAMPLES 13 TO 22

Solubility of the Foam Components

In these examples, the effect of the different foam stabilizers used in Examples 2 to 11 on the solubility of the individual components, especially of the halocarbon blowing agents, in the foaming formulation is demonstrated.

With the exception of the blowing agent and the isocyanate component, all the components listed in the formulation described above are premixed in the parts by weight given. After this mixture is transferred to a glass bottle, 30 parts by weight of trichlorofluoromethane is added, the bottle is closed carefully and the contents mixed intensively by shaking. After the gas bubbles have risen, the homogeneity of the mixture is evaluated visually. The results are given in Table 2 (see Example 1 for identity of the foam stabilizers)

TABLE 2

| Example | Foam Stabilizer | Appearance of the Mixture |
|---|---|---|
| 12 | A | clear |
| 13 | B | almost clear |
| 14 | C | clear |
| 15 | D | clear |
| 16 | E | almost clear |
| 17 | F | clear |
| 18 | G | slightly cloudy |
| 19 | H | clear |
| 20 | Comparison 1 | very cloudy |
| 21 | Comparison 2 | very cloudy |

We claim:

1. In a method for the preparation of rigid polyurethane and/or polyisocyanurate foams from a foaming mixture comprising (1) an at least difunctional polyisocyanate, (2) a polyol with 3 to 8 hydroxyl groups, said polyol having a hydroxyl number of about 150 to 800, (3) a catalyst, (4) a blowing agent, and (5) a foam stabilizer devoid of silicon atoms, the improvement which comprises that the foam stabilizer is a copolymer which is the copolymerization product of a) at least one vinyl monomer of the general formula

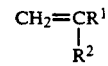

wherein
R$^1$ is hydrogen or methyl,
R$^2$ is

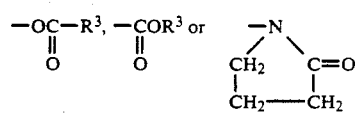

R$^3$ is alkyl with 1 to 4 carbon atoms, and b) allyl- or methallylpolyoxyalkylene ether of the general formula $$\begin{array}{c} R^4 \\ | \\ CH_2=C \\ | \\ CH_2 \\ | \\ O \\ | \\ (CH_2-CH-O-)_m(CH_2-CH_2-O)_nR^6 \\ | \\ R^5 \end{array}$$

wherein $R^4$ is selected from the group consisting of hydrogen and methyl, $R^5$ is selected from the group consisting of methyl and ethyl, $R^6$ is a group unable to react with an isocyanate group, m is a number from 1 to 120, n is a number from 1 to 90, and the quotient m/n has a value from 0.1 to 7, the average molecular weight of b) being between 400 and 5,000, the molar quotient a:b having a value from 1 to 10.

2. The improvement of claim 1, wherein a mixture of different monomers a) is used, $R^1$, $R^2$ and $R^3$ having different meanings in each of said different monomers.

3. The improvement of claim 1, wherein the molar quotient a:b in said polymerization product has a value from 3 to 5.

4. The improvement of claim 1 or 3, wherein allyl- or methallylpolyoxyalkylene ethers with an average molecular weight of 1,400 to 2,400 are used for the copolymerzation of said copolymer.

5. The improvement of claims 1, 2 or 3, wherein allyl- or methallylpolyoxyalkylene ethers with a ratio of m/n of 0.6 to 2 are used for the copolymerization of said copolymer.

6. The improvement of claim 1 or 3, wherein allyl- or methallylpolyoxyalkylene ethers with block-like distribution of the polyoxyalkylene units are used for the copolymerzation of said copolymer, the polyoxyethylene block being terminally linked.

7. The improvement of claim 1 or 3, wherein allyl- or methallylpolyoxyalkylene ethers with groups $R^6$ are used for the copolymerization of said copolymer wherein $R^6$ is a hydrocarbon group with 1 to 8 carbon atoms, $$-\underset{\underset{O}{\|}}{C}-NH-R^7 \text{ or } -\underset{\underset{O}{\|}}{C}-R^7$$

in which $R^7$ is a hydrocarbon with 1 to 8 carbon atoms.

8. The improvement of claims 1 or 3, wherein the amount of said foam stabilizer in the foaming mixture is about between 0.2 to 5 percent by weight, calculated on the amount of said compound (2) in the mixture.

9. In a method of claims 1 or 3, wherein the foaming mixture additionally comprises a flame retardant and a chain extender.

10. The foam products obtained by the method of claims 1, 2 or 3.

11. In a method for the preparation of rigid polyurethane and/or polyisocyanurate foams from a foaming mixture comprising (1) an at least difunctional polyisocyanate, (2) a polyol with 3 to 8 hydroxyl groups, said polyol having a hydroxyl number of about 150 to 800, (3) a catalyst, (4) a blowing agent and (5) a foam stabilizer devoid of silicon atoms, the improvement which comprises that the foam stabilizer is a copolymer which is the copolymerization product of a) at least one vinyl monomer of the general formula $$\begin{array}{c} CH_2=CR^1 \\ | \\ R^2 \end{array}$$

wherein $R^1$ is hydrogen or methyl, $R^2$ is $$-\underset{\underset{O}{\|}}{O}C-R^3, \; -\underset{\underset{O}{\|}}{C}OR^3 \text{ or } \begin{array}{c} \phantom{-}\diagup N\diagdown \\ CH_2 \phantom{XX} C=O \\ | \phantom{XXXX} | \\ CH_2-\!\!-\!\!-CH_2 \end{array}$$

$R^3$ is alkyl with 1 to 4 carbon atoms, and b) allyl- or methallylpolyoxyalkylene ether of the general formula $$\begin{array}{c} R^4 \\ | \\ CH_2=C \\ | \\ CH_2 \\ | \\ O \\ | \\ (CH_2-CH-O-)_m(CH_2-CH_2-O)_nR^6 \\ | \\ R^5 \end{array}$$

wherein $R^4$ is selected from the group consisting of hydrogen and methyl, $R^5$ is selected from the group consisting of methyl and ethyl, $R^6$ is hydrogen, m is a number from 1 to 120, n is a number from 1 to 90, and the quotient m/n has a value from 0.1 to 7, the average molecular weight of b) being between 400 and 5,000, the molar quotient a:b having a value from 1 to 10, and wherein the amount of said foam stabilizer in the foaming mixture is about between 0.2 to 5 percent by weight, calculated on the amount of said polyol (2) in the mixture.

* * * * *